United States Patent [19]

Ikezawa et al.

[11] Patent Number: 5,319,851
[45] Date of Patent: Jun. 14, 1994

[54] METHOD FOR MANUFACTURING A BEARING STRUCTURE OF A WIPER ARM

[75] Inventors: Ryu Ikezawa; Hironobu Kishi, both of Kiryu, Japan

[73] Assignee: Mitsuba Electric Manufacturing Co., Ltd., Gunma, Japan

[21] Appl. No.: 3,671

[22] Filed: Jan. 12, 1993

Related U.S. Application Data

[63] Continuation of Ser. No. 727,466, Jul. 9, 1991, abandoned.

[30] Foreign Application Priority Data

Jul. 13, 1990 [JP] Japan .................. 2-74615[U]

[51] Int. Cl.⁵ .................. F16C 33/00; B22F 3/24
[52] U.S. Cl. .................. 29/898.055; 29/898.054; 29/898.12; 29/898.13; 419/28; 384/295; 384/297; 15/250.31
[58] Field of Search .................. 29/898.054, 898.055, 29/898.056, 898.057, 898.058, 898.059, 898.12, 898.13; 419/5, 10, 27, 28; 15/250.31, 250.35, 250.34; 384/276, 295, 296, 297

[56] References Cited

U.S. PATENT DOCUMENTS

| | | | |
|---|---|---|---|
| 1,158,862 | 11/1915 | Sanford | 384/276 |
| 1,331,961 | 2/1920 | Klocke | 384/276 |
| 1,460,515 | 7/1923 | Selker | 384/276 |
| 1,652,468 | 12/1927 | Catlin | 29/898.059 X |
| 3,099,030 | 7/1963 | Zury | 15/250.35 |
| 3,188,679 | 6/1965 | Wubbe | 15/250.35 |
| 4,125,637 | 11/1978 | Tanner | 29/898.12 X |
| 4,393,563 | 7/1983 | Smith | 419/28 |
| 4,774,749 | 10/1988 | Furumura | 419/10 X |
| 4,932,097 | 6/1990 | Kobayashi et al. | 15/250.34 |

FOREIGN PATENT DOCUMENTS

| | | | |
|---|---|---|---|
| 289886 | 11/1988 | European Pat. Off. | 29/898.054 |
| 2326183 | 12/1974 | Fed. Rep. of Germany | 15/250.34 |
| 331028 | 6/1930 | United Kingdom | 29/898.059 |
| 731348 | 6/1955 | United Kingdom | 29/898.059 |
| 1441011 | 6/1976 | United Kingdom | 15/250.34 |

Primary Examiner—Mark Rosenbaum
Assistant Examiner—S. Thomas Hughes
Attorney, Agent, or Firm—Oliff & Berridge

[57] ABSTRACT

A method for manufacturing a bearing for a wiper arm structure includes the steps of: a) forming the bearing by sintering so that the outer peripheral surface of the bearing includes rough sintered surfaces of protruding ridges and recessed portion; b) sizing only the sintered surfaces of the protruding ridges without processing the recessing portions to smooth only outer peripheral surfaces of the protruding ridges so that the outer peripheral surfaces define a circular cross-section for the bearing, the sintered surfaces of the recessed portions remaining in a rough sintered condition relative to the outer peripheral surfaces of the protruding ridges which are sizing-processed; and c) forming a resin material on the outer peripheral surface of the bearing by insert molding. The rough sintered surfaces of the recessed portions provide increased adhesion between the recessed portions and the resin material relative to adhesion between the resin material and the smooth and circular outer peripheral surfaces of the protruding ridges.

1 Claim, 2 Drawing Sheets

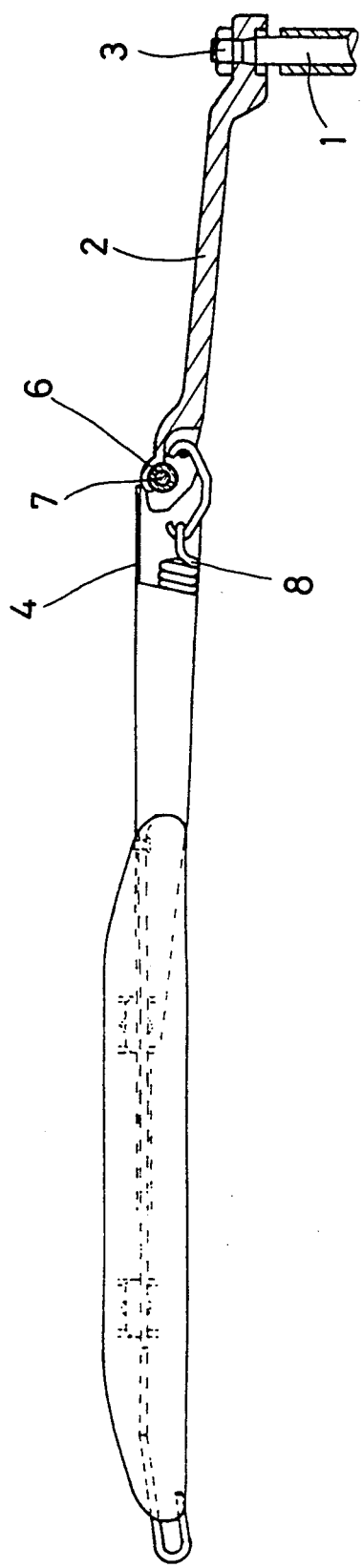
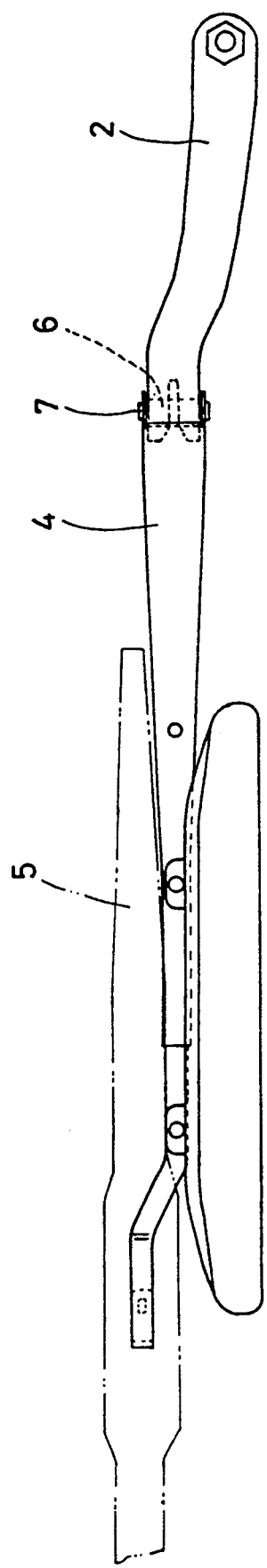
FIG. 1
FIG. 2

METHOD FOR MANUFACTURING A BEARING STRUCTURE OF A WIPER ARM

This is a continuation of application Ser. No. 07/727,466 filed Jul. 9, 1991, now abandoned.

BACKGROUND OF THE INVENTION

1. Field of the Invention

The present invention relates to a bearing structure of a wiper arm attached to an automobile or the like.

2. Description of the Related Art

In this kind of wiper arm, an arm shank with a blade at its leading end is rockably pivoted at the leading end of an arm support whose base end is integrally fixed to a wiper shaft, and the arm shank and the arm support are urged by a spring beyond a supporting point so that the blade abuts against a glass plane with a proper wiping force.

Conventionally, as shown in FIG. 6, when an arm shank is rockably pivoted at an arm support 2, a bushing unit 6, which is formed by insert-molding a bearing formed by sintering into a resin material, is pressed into a bearing portion of the arm support so as to prevent the arm support 2 and the bearing from being directly in contact with each other. Although the arm support 2 is coated beforehand, a coating material intrudes into a bearing hole 2a of the arm support 2. This makes it difficult to control the inner diameter of the bearing hole 2a.

On the other hand, since the outer surface of the bearing is smoothed in a sizing process when the bearing is manufactured, the adhesive force of the bearing to the resin material is small. Therefore, when the bushing unit 6 is pressed into the bearing hole 2a of the arm support 2 by pushing the back end of the bushing unit 6, the press-in load is applied to the resin material at the leading end of the bushing unit 6. If the press-in load is heavy, the resin material sometimes separates from the bearing and cracks "A" are generated due to differences in the inner diameter of the bearing hole 2a resulting from the intrusion of the coating material. This is a factor in lowering the reliability of the wiper arm.

SUMMARY OF THE INVENTION

It is, therefore, an object of the present invention to provide a bearing structure of a wiper arm capable of eliminating these problems.

In a wiper arm of the present invention, the leading end of an arm support fixed on the side of a wiper shaft and the base end of an arm shank with a blade are rockably pivoted through a support shaft, and a bushing unit composed of a bearing which the support shaft pierces and a resin material is pressed into a bearing hole bored at the leading end of the arms support. The peripheral surface of the bearing has outwardly protruding ridges and recessed portions and the recessed portions of the peripheral surface remain rough after the peripheral surface is processed.

According to the present invention having such construction, the adhesive force between the resin material and the bearing is strengthened and cracks are prevented from being generated in the resin material when the resin material is pressed into the bearing hole.

BRIEF DESCRIPTION OF THE DRAWINGS

The drawings show an embodiment of a bearing structure of a wiper arm according to the present invention.

FIG. 1 is a vertical cross-sectional view of an arm portion of a wiper arm;

FIG. 2 is a plan view of the arm portion;

DESCRIPTION OF THE PREFERRED EMBODIMENT

Figure 3:
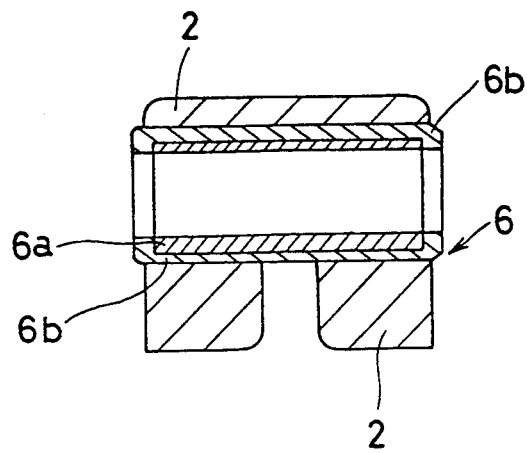
FIG. 3 is a principal enlarged cross-sectional view showing the state in which a bushing unit is pressed into a bearing hole.
Figure 4:
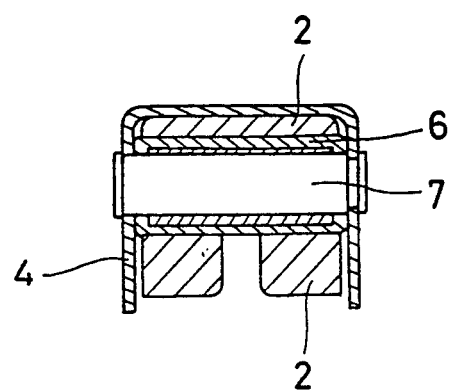
FIG. 4 is a principal enlarged cross-sectional view showing the state in which a support shaft is pivoted.

An embodiment of the present invention will be described with reference to the accompanying drawings. Referring to the drawings, a wiper shaft 1 is connected to a wiper motor (not shown), and a base end of an arm support 2 is integrally connected to the wiper shaft through a nut 3. A blade 5 is attached to the leading end of an arm shank 4, and the base end of the arm shank 4 is rockably pivoted at the leading end of the arm support 2.

A bearing hole 2a is bored at the leading end of the arm support 2, and a bushing unit 6, described below, is pressed into the bearing hole 2a. An inverse-U shaped base end of the arm shank 4 is located on the leading end of the arm support 2 from above, so that the arm support 2 and the arm shank 4 are rockably pivoted on a support shaft 7. A spring 8 is disposed between the arm shank 4 and the arm support 2, and the urging force of the spring 8 beyond the supporting point (the axial center of the support shaft 7) allows the blade 5 to wipe a glass plane.

Figure 5:
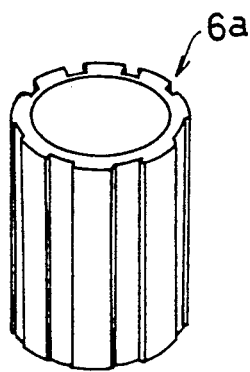
FIG. 5 is an enlarged perspective view of a bearing as a component of the bushing unit.
Figure 6:
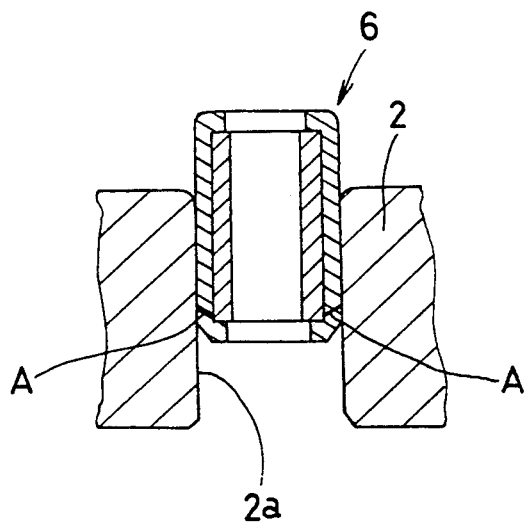
FIG. 6 is an operational explanatory view showing the prior art.

The bushing unit 6 is integrally composed of a bearing 6a formed by a sintering process and a resin material 6b formed by insert molding so as to cover the outer surface of the bearing 6a. The outer surface of the bearing 6a has outwardly protruding ridges and recessed portions as shown in FIG. 5 and sizing processing is conducted on only the outwardly protruding portions.

In the embodiment of the present invention having the above construction when the wiper arm is assembled, the bushing unit 6 is pressed into the bearing hole 2a of the arm support 2. The outer surface of the bearing 6a, as a component of the bushing unit 6, has outwardly protruding ridges and recessed portions, and even if the sizing processing is conducted on the bearing 6a, the recessed portions remain rough, and the resin material 6b is formed on the bearing surface by insert molding. As a result, the adhesion between the bearing 6a and the resin material 6b through the rough planes is secured and the adhered area is enlarged, and a stronger adhesive state than that of the prior art is obtained. Even if the press-in load is increased when the bushing unit 6 is pressed into the bearing hole 2a, it is possible to effectively prevent the resin material 6b from separating from the bearing 6a, and cracks from being generated, which greatly enhances the reliability of the wiper arm.

As described above, since the present invention has the above construction, a bushing unit composed of a bearing and a resin material is pressed into a bearing hole of an arm support in assembling a wiper arm. However, since the outer surface of the bearing has outwardly protruding ridges and recessed portions, the recessed portions remain rough after processing the outer surface, and the resin material is formed on the surface by insert molding. As a result, the adhesion between the bearing and the resin material through the rough planes is secured, the adhered area is enlarged, and a stronger adhesive state than that of the prior art is obtained. Therefore, even if the press-in load when the bushing unit is pressed into a bearing hole is increased, it is possible to effectively prevent the resin material from separating from the bearing 6a, and cracks from being generated which greatly enhances the reliability of the wiper arm.

What is claimed is:

1. A method for manufacturing a bearing for a wiper arm structure, wherein the wiper arm structure comprises a wiper shaft; and arm support fixed on an end of the wiper shaft; a bearing hole formed in an axial direction at a leading end of the arm support; the bearing axially pressed into the bearing hole and having an outer peripheral surface surrounded by a resin material; a pierce hole formed in the inner peripheral surface of the bearing; a support shaft pivotally mounted in the pierce hole; and an arm shrank having a base end supported by the support shaft, the arm shank having a blade mounted thereon, the base end of the arm shank being pivotally connected to the leading end of the arm support, the method for manufacturing the bearing comprising the steps of:

a) forming the bearing by sintering so that the outer peripheral surface of the bearing includes rough sintered surfaces of protruding ridges and recessed portions;

b) sizing only the sintered surfaces of the protruding ridges without processing the recessed portions to smooth only outer peripheral surfaces of the protruding ridges so that the outer peripheral surfaces defined a circular cross-section for the bearing, the sintered surfaces of the recessed portions remaining in a rough sintered condition relative to the outer peripheral surfaces of the protruding ridges which are sizing-processed; and c) forming the resin material on the outer peripheral surface of the bearing by insert molding, the rough sintered surfaces of the recessed portions providing increased adhesion in the axial direction between the recessed portions and the resin material relative to adhesion between the resin material and the smooth and circular outer peripheral surfaces of the protruding ridges.

* * * * *